Patented June 24, 1941

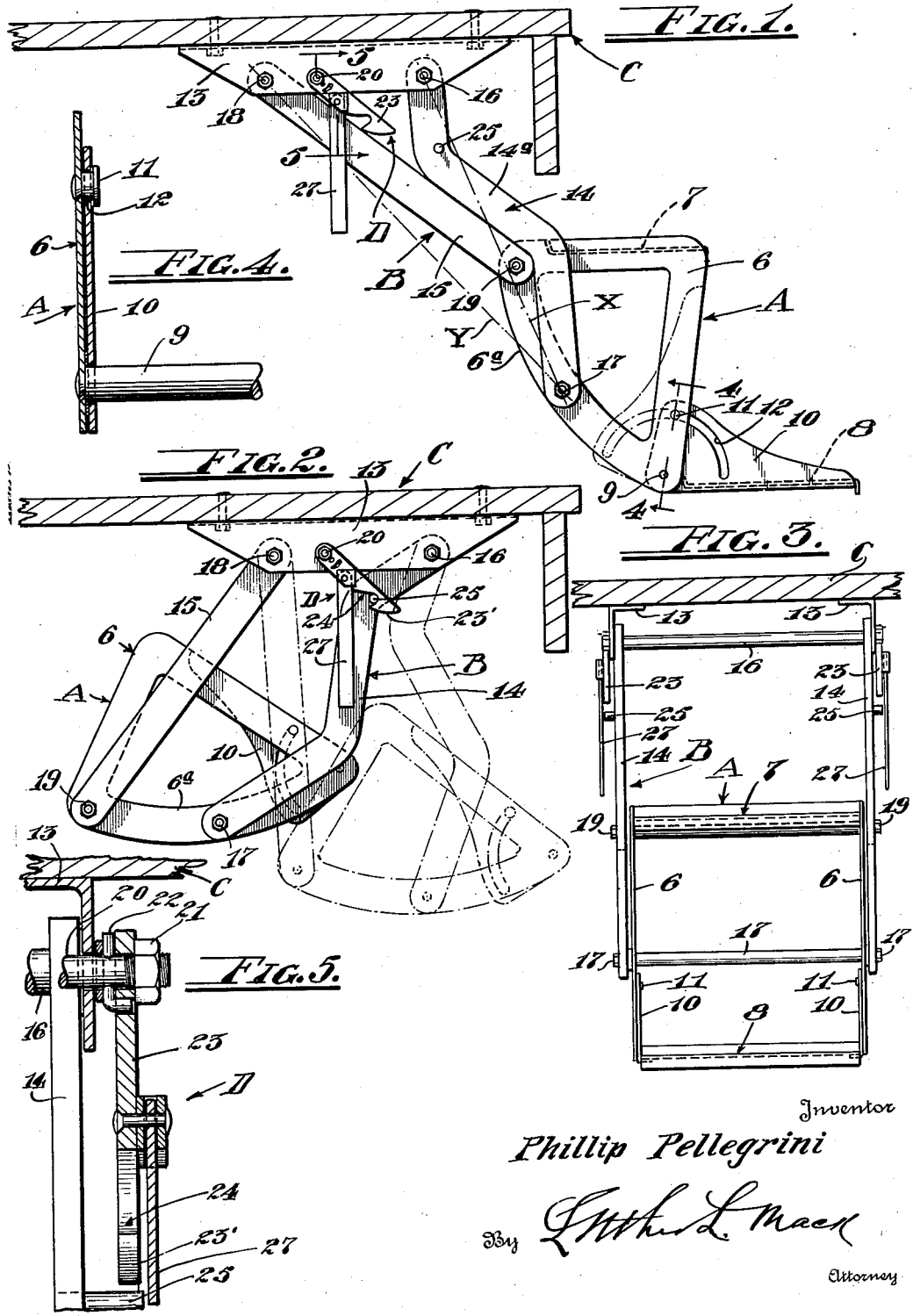

2,246,986

UNITED STATES PATENT OFFICE 2,246,986

FOLDING STEP FOR TRUCKS

Phillip Pellegrini, Glendale, Calif., assignor to Virgil McCombs, Los Angeles, Calif.

Application September 2, 1939, Serial No. 293,205

9 Claims. (Cl. 280—166)

This invention relates to improvements in truck steps of the type forming the subject matter of my application for patent, Serial No. 225,317, filed August 17, 1938.

A purpose of the present invention is to simplify the construction and operation of truck steps of the character described whereby to provide a step which consists of comparatively few parts, is subject to easier installation upon a truck or the like, may be more quickly and easily moved from out of the way position beneath the truck, into position of use extending outwardly from the truck and vice versa, and will be rugged and strong yet light in weight, rattleproof, capable of long service, and automatically locked against accidental movement out of its retracted and extended positions in a particularly novel and efficacious manner.

Another purpose of my invention is to provide in a folding truck step of the character described a novel form of hanging or suspension means including pairs of supporting members which are pivoted on the truck and the step unit in such a manner as to provide for the desired movement of the step into and out of position of use as well as the locking of the step against accidental movement out of position of use, said members coacting when the step is in position of use, so that they will effectively brace and lend rigidity to the structure as well as lock it as aforesaid, without the use of latches, links or other extraneous elements as heretofore required in this art to lock or hold the step in position of use.

A further purpose is to provide in a step of the character described a novel and simple form of latch means which will automatically lock the step in-out-of-the-way position incident to the movement of the step in such position.

I have shown in the accompanying drawing a preferred form of folding step for trucks, embodying my invention, subject however, to modification within the scope of the appended claims, without departing from the spirit of my invention.

Referring to the drawing:

Fig. 1 is a side elevation of a truck step embodying my invention as when installed on a truck and disposed in position of use.

Fig. 2 is a side elevation of the step as when held in out of the way position beneath the bed or platform of the truck, the dotted lines showing the safe position the step will assume should the latch means fail to operate or accidentally release the step.

Fig. 3 is a front elevation of the step as shown in Fig. 1.

Fig. 4 is an enlarged fragmentary detail section on the plane of line 4—4 of Fig. 1.

Fig. 5 is an enlarged section taken on the plane of line 5—5 of Fig. 1.

One embodiment of step apparatus of my invention, will now be described in detail and as shown in the accompanying drawing generally includes, a step structure or unit A, a suspension or hanging means B therefor arranged to be pivotally suspended from the bed or platform C of a truck or the like and connected with the step unit in such manner as to provide for movement of such unit from out-of-the-way position (Fig. 2) lying beneath and inwardly spaced inwardly from the edge (side or end) of the truck platform, into position of use (Fig. 1) extended outwardly from said edge, and vice versa, together with a manually releasable latch means D which will automatically lock the step unit in out-of-the-way position.

The step unit A may consist of one or more step treads and a suitable frame work, as desired, depending upon the height of the platform from the ground and other conditions at hand. It may consist of fixed treads or have at least one tread foldable into and out of position of use.

In the present embodiment of my invention, I have shown a step structure or unit which includes skeleton side frames 6, an upper tread 7 welded or otherwise fixed to and between the upper ends of the said frames, and a lower tread 8 supported by and between the lower ends of the side frames. The lower tread 8 may, as here shown, be pivoted to the side frames by means of a crossrod 9 or otherwise, in such manner that it is movable into and out of position of use. Flanges 10 are provided on the ends of the lower tread and engage the inner surfaces of the side frames to serve as guides and lend rigidity and strength to the structure. Headed pins 11 are inserted through arcuate slots 12 in these flanges and then riveted on the side frames for slidably securing the flanges and side frames together. When swung inwardly the lower tread 8 will be disposed in out-of-the-way position as seen in Fig. 2, and the step unit made more compact. When swung outwardly the lower tread, limited by the pins 11 engaging the ends of the slots 12, will be disposed and rigidly supported in position of use as shown in Fig. 1.

The means B for supporting the step unit A includes angle brackets 13 adapted to be bolted to the truck platform C for pivotally suspending therefrom an outer pair of step unit supporting arms or members 14 and an inner pair of step unit supporting arms 15. In accordance with my invention these members are so constructed, relatively arranged and pivoted to the truck and step unit that the latter may be readily disposed in the out-of-the-way and extended positions shown in Figs. 2 and 1, respectively, with considerable ease and at will, the supporting members engaging one another to limit the movement thereof to position locking the step unit in position of use, when the step is disposed in such position. By having the step unit supporting members arranged to act as stops and as braces while also locking the step unit in position of use, the use of links, latches and extraneous elements for holding the step rigidly and safely in position of use is unnecessary and the step structure is therefore greatly simplified and reduced as to cost as well as made easier of operation.

Referring more specifically to the hanging and supporting means B it is seen that the supporting members 14 are pivoted at their upper ends by means of the crossrod 16 to the brackets 13 on the truck platform, whereas the lower ends thereof are pivoted to the side frames 6 by means of a similar crossrod 17.

As here shown the members 14 lie upon the outer surfaces of the side frames 6 and are pivoted thereto at points rearwardly of the center and between the upper and lower ends thereof, so that the step unit tends to gravitate outwardly and downwardly about the axis of the pivotal connection of said members and side frames.

The supporting members 15 lying inwardly of the members 14 are pivoted at their upper ends to the brackets 13 by means of a crossrod 18, whereas their lower ends are pivoted to the side frames 6 by means of a crossrod 19, at points spaced from the pivot points of the members 14. As here shown, the members 15 are pivoted adjacent the upper and inner corners of the side frame as when the step unit is in position of use, whereby the members 14 will contact the member 15 to serve as stops and hold the step unit against unintentional movement out of position of use as best shown in Fig. 1. Any construction and arrangement of the members 14 and 15 may be used provided they will co-act to act as stop and hold the step unit firmly and safely in position of use. In the present instances the members 14 and 15 are in the same vertical planes so that their edges will contact. Consequently the members 14 are provided with obliquely extending intermediate portions 14a, the edges of which will engage the edges of the members 15 which latter are straight. This contact taking place at and adjacent the lower ends of the members 15 and between the ends of the members 14 will insure an effecting bracing of the step unit and a secure locking thereof against accidental movement out of position of use.

Another factor insuring an effective holding of the step unit in position of use is that the relative arrangement of the pivotal connections of the members 14 and 15 with the truck supported brackets 13 and the step unit, provide a toggle action wherein the pivot points of the members 15 on the step unit are disposed past center, i. e. past straight lines X drawn through the pivots at the ends of the members 14 and also past straight lines Y drawn through the lower pivot points of the members 14 and the upper pivot points of the members 15, as seen in Fig. 1. In other words the portions 6a of the side frames 6, lying between the lower pivots of the members 14 and 15 respectively, together with the members 15 themselves, constitute "toggles" which as shown in Fig. 1, move past center and at the "toggle" joints thereof, and contact the intermediate portions of the members 14 when the step unit is in position of use, whereby to "lock" the step unit as aforesaid. When thus locked the step unit will not collapse or move under downward pressure as would be exerted when a person steps on the inner or back parts of the step treads of the step unit, or in fact steps on any part of said unit. However, when the step unit is lifted from beneath it may be swung upwardly and inwardly beneath the truck, the members 14 and 15 moving freely apart and swinging inwardly as the step unit is moved or pushed inwardly towards its out-of-the-way position.

When the members 14 swing rearwardly a predetermined extent, the latch means D will automatically lock said members and the step unit in out-of-the-way position as shown in Fig. 2 in full lines. The latch means D as here employed comprises a crossrod or shaft 20 (see Fig. 5) rotatably supported by and between the brackets 13. Fixed on the outer ends of the shaft 20 by means of fastenings 21 and 22, so as to depend from said shaft are latch members 23 having one or more notches 24 for lockingly receiving pins 25 fixed on the members 14. As the members are swung inwardly during movement of the step unit into retracted position the pins 25 engage the cam ends 23' of the latch members 23 and move past said ends on the under sides of the latch members to points past the notches 24 and then come to rest in said notches due to the gravitational movements of the members 14 and said latch members, whereby to automatically lock the step unit in retracted position.

Handles 27 fixed to and depending from said latch members as shown in Fig. 5 provide for release of the latches 23. These handles also act as weights to insure a quick gravitational movement of the latch members into locking engagement with the pins 25, whereby to insure a locking of the step unit should the latter be quickly and forcibly moved into out-of-the-way position.

Should the step unit while in retracted position, be backed against a loading platform or the like, it will move inwardly and thus yield sufficiently to prevent damage thereof. The latches will catch and lock the step unit as it swings back into its normal retracted position. Should the latch means fail to automatically lock or accidentally release, the step unit will swing outward but not sufficiently to extend beyond the adjacent edge of the truck platform. The dotted line showing in Fig. 2 indicates the "safe" position the step structure will assume when the latches are released or fail to automatically lock when the step unit is moved into retracted position.

It is now apparent that when the latches are released it is necessary for the operator to grasp and pull outwardly on the step in order to bring it into position of use from the position shown in dotted lines in Fig. 2, the latter position being the position into which the step will gravitate without the assistance of the operator. As the step unit swings into position of use the foldable tread 8 thereof tends to swing downwardly and outwardly into horizontally extended position, but may be positively moved into such position by the operator when desired. When a step having fixed treads is used it is obvious that it will gravitationally swing into position of use when the step is swung outward on the members 14 and 15. Should it be desired to cause the step unit to gravitationally swing into fully extended position upon release of the latches, this can be accomplished by setting the latches to support the step in a higher position, rearwardly and upwardly spaced from that shown in Fig. 2, whereby the increased momentum thus afforded will carry the step past the dotted line position (Fig. 2) it would otherwise assume.

I claim:

1. A step for trucks, comprising a step unit and means for mounting said unit on a truck, for movement from out of the way position into position of use and vice versa, including pairs of supporting members pivotally suspended on the truck, and pivot means connecting said pairs of supporting members with said unit at points so spaced and related that portions of said members will have edge to edge contact to limit the movement of said members and said unit and hold the unit in position for use as a step, upon the movement thereof into such position.

2. A step for trucks, comprising a step unit and means for mounting said unit on a truck for movement from out of the way position into position of use and vice versa, including pairs of supporting members pivotally suspended on the truck, and pivot means connecting said pairs of supporting members with said unit in such a manner that the members of one pair will engage the members of the other pair to limit the movement of said members and unit and hold the unit in position for use upon movement thereof into such position.

3. A step for trucks, comprising a step unit, and means for mounting said unit on a truck for movement from an out of way position into a position for use and vice versa, including a pair of supporting members pivotally suspended on the truck, pivot means connecting said pair of members with said unit, another pair of supporting members pivotally suspended on the truck, other pivot means connecting the second named pair of supporting members with said unit at points which are spaced above the first named pivot connection on the unit, when said unit is disposed in a position of use, said pairs of members being arranged so that the members of one pair at points adjacent the unit connected ends thereof will contact the members of the other pair when the step is disposed in position of use, for holding said step against accidental movement out of such position.

4. A step for trucks comprising a step unit, and means for mounting said unit on a truck for movement from an out of the way position into a position for use and vice versa, including a pair of supporting members pivotally suspended on a truck, pivot means connecting said pair of members with said unit, another pair of supporting members pivotally suspended on the truck, other pivot means connecting the second named pair of supporting members with said unit at points which are spaced above the first named pivot connections on the unit, when said unit is disposed in a position of use, said pairs of members being arranged so that the members of one pair, at points adjacent the unit connected ends thereof, will contact the members of the other pair when the step is disposed in position of use, for holding said step against accidental movement out of such position, the members of said pairs extending downwardly and outwardly from the truck connected portions thereof when the step unit is in position of use, and extending inwardly and downwardly from such truck connected points when the step is in use of the out of way position.

5. A step for trucks, comprising a step unit, means for mounting said unit on a truck for movement from out of the way position into position of use and vice versa, including pairs of supporting members pivotally suspended on the truck, pivot means connecting said pairs of members with said unit at points so spaced and related that portions of said members will have edge to edge contact to limit the movement of said members and unit and hold the unit in position for use as a step and latch means for automatically locking said supporting members against movement from out of the way position when the step unit is moved into such position.

6. A step for trucks, comprising a step unit, means for mounting said unit on a truck for movement from out of the way position into position of use and vice versa, including pairs of supporting members pivotally suspended on the truck, pivot means connecting said pairs of members with said unit at points so spaced and related that portions of said members will abut one another to limit the movement of said members and unit and hold the unit in position for use as a step, latch means for automatically locking said supporting members against movement from out of the way position when the step unit is moved into such position, and manually operable means for leasing said latch means.

7. A step for trucks, comprising a step unit, means for mounting said unit on a truck for movement from out of the way position into position of use and vice versa, including pairs of supporting members pivotally suspended on the truck, pivot means connecting said pairs of members with said unit in such a manner that the members of one pair will engage the members of the other pair to limit the movement of said members and unit and hold the unit in position for use, latch members adapted to be pivotally mounted on the truck for gravitational movement into locking position, and elements on the supporting members of one pair adapted to be engaged by said latch members when the step unit is moved into out of the way position, for retaining said unit and the said supporting members in out of the way position.

8. A step for trucks, comprising a step unit and means for mounting said unit on a truck for movement from out of the way position into position of use and vice versa, including pairs of supporting members pivotally suspended on the truck, pivot means connecting said pairs of members with said unit in such a manner that the members of one pair will engage the members of the other pair to limit the movement of said members and unit and hold the unit in position for use, latch members adapted to be pivotally mounted on the truck for gravitational movement into locking position, pins on the supporting members of one pair adapted to be engaged by said latch members when the step unit is moved into out of the way position, for retaining said unit and the said supporting members in out of the way position, and manually operable members associated with said latch members so as to normally urge said latch members into latching position and being movable for releasing said latch members.

9. A step for trucks comprising a step unit, means for mounting said unit on a truck for movement into and out of position of use, including outer supporting members pivotally suspended on the truck at their upper ends, pivot means connecting the lower ends of said supporting members with the step unit at a point such that said step unit tends to gravitate forward and downward, inner supporting members pivotally suspended on the truck at their upper ends, pivot means for connecting the lower ends of said inner members to the step unit at points which are spaced above the first named pivot means and so located that the lower portions of the inner members will contact intermediate portions of the outer members to limit the movement of the step unit, to a position of use, with the second pivot means spaced outwardly from a straight line drawn between the first named pivot means and the points of pivotal connection of the inner members with the truck whereby to lock the step unit in position of use.

PHILLIP PELLEGRINI.